United States Patent

Mues et al.

[11] 4,047,921
[45] Sept. 13, 1977

[54] TREATING MICRO-NUTRIENT DEFICIENCIES IN PLANTS

[75] Inventors: Volker Mues, Wuppertal; Johannes Niggemann, Leverkusen, both of Germany

[73] Assignee: Bayer Aktiengesellschaft, Leverkusen, Germany

[21] Appl. No.: 668,151

[22] Filed: Mar. 18, 1976

[30] Foreign Application Priority Data

Mar. 22, 1975 Germany .............................. 2512816
Nov. 13, 1975 Germany .............................. 2550935

[51] Int. Cl.$^2$ ............................................. C05F 11/00
[52] U.S. Cl. ............................................. 71/11; 71/57;
 71/64 G; 71/64 SC; 71/DIG. 2; 423/367
[58] Field of Search ..................... 71/1, 11, 27, 64 A,
 71/64 SC, DIG. 2, 55–57, 64 G; 423/367

[56] References Cited
PUBLICATIONS

Naturwissenschaften, 1958, p. 338, Hofmann.
Hofman, Z. Anorg. Allg. Chemie, 10, 262 (1895).
Hofman, Z. Anorg. Allg. Chemie, 11, 31 and 278 (1896).
Hofman, Z. Anorg. Allg. Chemie, 12, 146 (1896).
J. Liebigs Ann. Chem. 312, 1 (1900).
Muller, C.R. Acad. Sci., Paris 104, 992 (1887).
Biesalski & Hauser, Z. Anorg. Allg. Chemie, 74, 384 (1912).
Ungarelli, Gass. Chim. Ital., 55, 118 (1925).
Holz et al., Monatshefte Chem. 56 (79) (1930).
Brintzinger et al., Z. Anorg. Allg. Chemie 225, 217–220 (1936).

Primary Examiner—Frank A. Spear, Jr.
Assistant Examiner—Ferris H. Lander
Attorney, Agent, or Firm—Burgess, Dinklage & Sprung

[57] ABSTRACT

Plants suffering from micro-nutrient deficiencies are treated with prussiates of the formula $$M_a[Fe(CN)_5X]_b$$

in which
M is an alkali metal ion, alkaline earth metal ion, heavy metal ion, ammonium ion or hydrogen,
X is a group which can occupy the sixth coordination position on the iron, or a suitable organic radical,
a is 2, 3, 4 or 5, and
b is 1, 2 or 3.

The prussiate may be present as a hydrate and/or may be in admixture with a carrier.

8 Claims, No Drawings

TREATING MICRO-NUTRIENT DEFICIENCIES IN PLANTS

The present invention relates to the use of certain prussiates (which are known) for plant nutrition and for the prevention and cure of certain deficiency diseases in plants.

In order to provide optimum growth conditions for a plant it is necessary that in addition to the macro-nutrients, the micro-nutrients should always be present in sufficient amounts in a substrate and in particular should be present in such a form that they can be absorbed by the plant. It is therefore frequently necessary to counteract a deficiency of micro-nutrients, available to the plant, in substrates used for the growing of plants, either by adding appropriate micro-nutrient fertilizers or by converting the sparingly soluble micro-nutrient compounds present in the substrate into more readily soluble substances. Fertilizing with trace elements can thus be carried out in very diverse ways.

For example, it has long been known that readily soluble salts of trace element cations with non-phytotoxic acids can be employed to provide plants with the micro-nutrients in question. Using such conventional fertilizers, it is indeed possible to achieve an effective supply of micro-nutrient in weakly acid or in neutral substrates; however, their use in weakly basic soils suffers from considerable disadvantages. Thus, the bulk of the polyvalent metal ions, especially of the iron ions, cannot be taken up by the plants because, in a weakly alkaline substrate, these ions separate out in the form of sparingly soluble hydroxides and therefore do not contribute to plant nutrition.

Furthermore, it has been disclosed that the plants can be supplied with the requisite micro-nutrient cations in the form of the chelate complexes with citric acid, gluconic acid, nitrilotriacetic acid, ethylene-diaminetetraacetic acid or ethylenediamine-N,N'-di-(o-hydroxyphenyl)-acetic acid. (See "Der Vegetationsversuch" ("Vegetation Experiments") in "Methodenbuch" ("Book of Methods"), Volume III, Neumann Verlag, Radebeul, Berlin, 1951, 180–194; Plant Physiology 26, 411 (1951); Soil Science 80, 101–108 (1955) and "Organic Sequestering Agents," John Wiley and Sons, Inc., New York, 1959, 455–469).

Using such complexes it is possible to supply the plants with micro-nutrients not only in weakly acid or neutral soils but also, to a certain degree, in weakly alkaline soils because as a result of the relatively great stability of these complexes, an undesired precipitation of the micro-nutrient cations in the neutral or weakly basic medium is largely avoided. Nevertheless, the use of the chelate complexes for the stated purpose suffers from some disadvantages. Thus, the duration of action of chelate complexes of citric acid or gluconic acid is only relatively short, since these naturally occurring acids can be degraded relatively rapidly by soil microorganisms.

The chelate complexes of the synthetic aminopolycarboxylic acids — with the exception of the iron complex of ethylenediamine-N,N'-di-(o-hydroxyphenyl)-acetic acid, which is important for combating chlorosis — can only be employed with certain limitations in strongly alkaline soils, because the stability of the complexes does not always suffice to avoid the micro-nutrient cations being immobilized in the form of sparingly soluble hydroxides or oxides. A further disadvantage is that the aminopolycarboxylic acids form very stable, highly toxic and at the same time water-soluble chelate complexes with the heavy metal ions of cadmium, lead and mercury, which can be present in the soil in the form of almost insoluble compounds. Since these heavy metal ion complexes can, because of their good solubility, pass into the soil water, the use of aminopolycarboxylic acids is not safe for toxicological reasons. It is true that the iron complex of ethylenediamine-N,N'-di-(o-hydroxyphenyl)-acetic acid is, as already mentioned, of practical importance in combating chlorosis; however, it is a disadvantage that this compound can only be manufactured with relative difficulty and is furthermore not light-stable.

It has now been found that the known prussiates (prussides or pentacyanoferrates) of the general formula

$$M_a[Fe(CN)_5X]_b \qquad (I),$$

in which
M is an alkali metal ion, alkaline earth metal ion, heavy metal ion, ammonium ion or hydrogen,
X is a group which can occupy the sixth coordination position on the iron or a suitable organic radical,
a is 2, 3, 4 or 5, and
b is 1, 2 or 3,
present per se or as their hydrates, are very suitable for supplying plants with micro-nutrients, especially iron.

The present invention therefore provides a fertilizer composition for supplying plants with micro-nutrients, containing as active ingredient a prussiate of the formula (I), which may be in the form of a hydrate, in admixture with a solid or liquefied gaseous diluent or carrier or in admixture with a liquid diluent or carrier containing a surface-active agent.

The present invention also provides a method of supplying plants with micro-nutrients, which comprises applying to the plants or a plant habitat a prussiate of the formula (I), which may be in the form of a hydrate, alone or in the form of a composition containing as active ingredient a prussiate of the formula (I), which may be in the form of a hydrate, in admixture with a diluent or carrier.

Preferably, in the formula (I), M is sodium, potassium, magnesium, calcium, barium, ammonium or hydrogen, and X is hydrazine ($NH_2NH_2$) or, more especially, nitroso (NO), aquo ($H_2O$), carbonyl (CO), ammine ($NH_3$), nitrito ($NO_2$), arsenito ($AsO_2$) or sulfito ($SO_3$), or one of the organic radicals $NO-CH_3$, $NO-C_2H_5$ or, more especially, $NO-S-C(=NH)NH_2$, with a and b resulting from the sum of the charges of the five negatively charged cyanide ions, the Fe cation having a double or triple positive charge and the neutral positively charged or negatively charged radical X, and the valency of the cation M.

The outstanding activity of the compounds according to the invention in supplying plants with trace elements must be described as very surprising, since it was to be assumed, in the light of the state of the art, that the compounds according to the invention would only be of poor suitability for the stated purpose, since, compared to the aminopolycarboxylic acids, they contain iron in a very powerfully complexed form. In contrast to expectations, however, the compounds according to the invention possess a better or at least equally good activity, in micro-nutrient fertilization, to that of the iron chelate complexes of ethylenediamine-N,N'-di-(o-hydroxyphonyl)acetic acid and of sodium ethylene-diaminetetracetate, which are the nearest compounds of the same type of action. It is particularly advantageous that the compounds according to the invention do not form stable complexes with the heavy metal ions of cadmium, lead and mercury present in the soil; hence, a use of prussiates for supplying plants with micro-nutrients is also safe on toxicological grounds. The compounds according to the invention thus represent a valuable enrichment of the art.

The following may be mentioned as examples of the prussiates of the formula (I) which can be used according to the invention: $K_2[Fe(CN)_5NO]$, $Na_2[Fe(CN)_5NO]$, $Na_4[Fe(CN)_5NO]$, $Na_2[Fe(CN)_5H_2O]$, $Na_3[Fe(CN)_5H_2O]$, $K_3[Fe(CN)_5CO]$, $Na_3[Fe(CN)_5CO]$, $Na_2[Fe(CN)_5NH_3]$, $Na_2NH_4[Fe(CN)_5NH_3]$, $Na_3[Fe(CN)_5NH_3]$, $K_3[Fe(CN)_5NO_2]$, $NaK_2[Fe(CN)_5NO_2]$, $Na_3[Fe(CN)_5NO_2]$, $K_4[Fe(CN)_5NO_2]$, $Na_4[Fe(CN)_5NO_2]$, $K_4[Fe(CN)_5AsO_2]$, $Na_4[Fe(CN)_5AsO_2]$, $Na_5[Fe(CN)_5SO_3]$ and $Na_5[Fe(CN)_5NOSC(=NH)NH_2]$; all of these prussiates of the formula (I) can, of course, be used in the form of their hydrates.

The prussiates to be used according to the invention, and their use in analytical chemistry as reagents, for example, for detecting sulfide and hydrogensulfide ions and various organic chemicals are already known (see E. Hofmann and A Wunsch, Naturwissenschaften 1958, 338; K.A. Hofmann, Z.Anorg.Allg. Chemie 10, 262 (1895); ibid. 11, 31 and 278 (1896); ibid. 12, 146 (1896); J.Liebigs Ann. Chem. 312, 1 (1900); J.A.Muller, C.R.Acad.Sci.Paris 104, 992 (1887); E.Biesalski, O.-Hauser, Z.Anorg.Allg.Chemie 74, 384 (1912); A.Ungarelli, Gazz.Chim.Ital. 55, 118 (1925); F.Holzl, K.Rokitanski, Monatshefte Chem. 56, 79 (1930); and H.Brintzinger, H.Osswald, Z.Anorg.Allg. Chemie 225, 217-220 (1936)). However, their use for plant nutrition and for preventing and curing deficiency diseases in plants has not previously been proposed.

The prussiates of the formula (I) can be prepared from hexacyanoferrates or pentacyanoferrates by customary methods (see the literature cited above). The reactions take place in accordance with the following general equations:

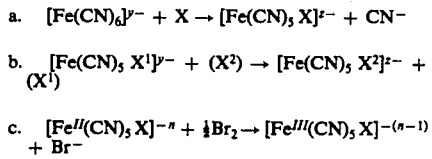

a. $[Fe(CN)_6]^{y-} + X \rightarrow [Fe(CN)_5 X]^{z-} + CN^-$ b. $[Fe(CN)_5 X^1]^{y-} + (X^2) \rightarrow [Fe(CN)_5 X^2]^{z-} + (X^1)$ c. $[Fe^{II}(CN)_5X]^{-n} + \frac{1}{2}Br_2 \rightarrow [Fe^{III}(CN)_5X]^{-(n-1)} + Br^-$ wherein
y is 2, 3, 4 or 5,
z is 2, 3, 4 or 5,
n is 3, 4 or 5,
X represents the above-mentioned neutral or positively or negatively charged radicals, and
$X^1$ and $X^2$ represent the neutral or positively or negatively charged radicals mentioned for X.

As already mentioned, the prussiates of the formula (I), which can be used according to the invention, are very suitable for the prevention and cure of iron-deficiency diseases in plants. However, in some cases they can also be used for combating other plant deficiency diseases, such as rosette disease, grey speck disease, bog disease and white-bud disease, provided that they contain the particular nutrient ions to the deficiency of which the particular plant diseases are attributable.

The prussiates of the formula (I) which can be used according to the invention have only a low phytotoxicity and are therefore well tolerated by plants.

The plants which are prone to deficiency diseases, especially iron deficiency diseases (iron deficiency chloroses), include species of cereals (for example rice, maize and millet), tuber and root crops (for example sugarbeet), oloaginous fruits (for example soya bean, groundnut, olive and sunflower), table fruit (for example peach, pear, apple, apricot, plum, cherry, quince, citrus fruit, grape, hazelnut, walnut, currant, gooseberry, raspberry, blackberry, bilberry, pineapple and avocado), vegetables (for example lettuce, broad bean, pea, tomato and melon), decorative trees and shrubs (for example rose, eucalyptus, liquidambar, mimosa, elm, catalpa, spirea, pyracantha, juniper, ligustrum, hibiscus, syringa and hydrangea), perennials (for example delphinium, primula, peony, papaver, antirrhinum, iris and lupin), pot plants and annuals (for example pelargonium, petunia, gardenia, calceolaria, chrysanthemum, camellia and begonia), peat-loving plants (for example azalea, rhododendron, erica and skimmia) and grasses (for example lawn grasses).

The active compounds according to the instant invention can be utilized, if desired, in the form of the usual formulations or compositions with conventional inert (i.e. plant compatible or herbicidally inert) pesticide diluents or extenders, i.e. diluents, carries or extenders of the type usuable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. clorobenzenes, etc.), cycloalkanes, (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially fertilizers, or plant protection agents such as nematocides, insecticides, acaricides, fungicides, bactericides, rodenticides, herbicides, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates overall compositions which comprise mixtures of a conventional dispersible carrier vehicle such as (1) a dispersible inert finely divided carrier solid, and/or (2) a dispersible carrier liquid such as an inert organic solvent and/or water, preferably including a surface-active effective amount of a carrier vehicle assistant, e.g. a surfaceactive agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplace crop spraying techniques. Only up to at most about a few liters/hectare are needed, and often amounts only up to about 15 to 1,000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

The active materials are used in accordance with the methods customary in agriculture and in horticulture, that is to say, for example by direct introduction into the soil, by watering, spraying, atomizing, scattering, dusting and the like. The following may be mentioned as special types of application: root application, leaf application, stem injection and bark application. In the case of root application, the fertilizer can either be mixed with the culture substrate or be introduced into furrows in the soil. Furthermore it is possible to introduce the fertilizer into the lower root region by means of a fertilizer lance or through punched or drilled holes. Application to the leaf is as a rule effected by spraying the plants with a fertilizer solution or dipping plants or parts of plants into a fertilizer solution. In the case of stem injection, the fertilizer is directly introduced into the plants through bore-holes in tree trunks or branches. Bark application can be effected by spraying the bare wood with the fertilizer solution, or by placing bands, for example of textile, paper or foam plastic, impregnated with nutrients, on tree trunk or branches, if appropriate after partial or complete removal of the layer of bark or cork in the treatment zone. Application to the bark by means of pastes containing nutrient is also possible. Furthermore, the prussiates which can be used according to the invention can be absorbed on ion exchangers and be employed, in this form, as fertilizers.

The amount employed of the prussiates to be used according to the invention can be varied within a fairly wide range. It depends essentially on the nature of the soil and on the nutrient requirement of the particular plant. In general, the amounts of active compound used are between 0.1 and 100 kg/ha and preferably between 1 and 50 kg/ha.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular active materials of the present invention are illustrated, without limitation, by the following examples:

Example 1

Combating iron deficiency/root uptake test/greenhouse

Test plant: Chrysanthemum indicum (variety: Yellow Delaware)
Culture substrates: Mixture of polystyrene foam flock (Styromull) and potassium alginate in the volume ratio of 10:1.

Test plants were grown in a culture substrate of the above-mentioned composition, fertilization and watering being effected by adding, twice weekly, a mineral iron deficiency nutrient solution according to Hoagland and Arnon (Circular 347, College of Agriculture, University of California, Berkeley 1950). The completely chlorotic test plants grown in this way were transplanted, at the five-leaf stage, into another culture substrate of the above-mentioned composition, to which, however, the particular desired amount of iron fertilizer had been added. During the further growth, fertilization and watering were effected in the same way as during the initial growth.

The evaluation was made after 26 days.

In each case, the average number of newly formed leaves was determined on all test plants. Furthermore, the intensity of the green color of newly formed and of previously present older leaves was rated and expressed on a numerical scale. In this, the figures denote:

1 = 0% chlorotic (dark green)
3 = 25% chlorotic
5 = 50% chlorotic
7 = 75% chlorotic
9 = 100% chlorotic (corresponding to the untreated control plants)

The nutrients, nutrient concentrations and experimental results can be seen from the table which follows:

Table 1

Combating iron deficiency/root uptake test/greenhouse
Test plant: Chrysanthemum indicium/variety: Yellow Delaware

| Nutrient Preparation | Water-solubility of the preparation | Fe content of the preparation [in % by weight] | Nutrient preparation concentration in the substrate [mg/l] | Iron concentration in the substrate [mg/l] | Intensity of the green color of young leaves | Intensity of the green color of old leaves | Average number newly of formed leaves |
|---|---|---|---|---|---|---|---|
| — (control) | — | — | — | — | 9 | 9 | 0 |
| Sequestrene 138 Fe+ (known) | complete | 6.0 | 50 | 3 | 1 | 4 | 8 |
| $Na_2[Fe(CN)_5NO] \cdot 2H_2O$ (1) | complete | 18.7 | 8 | 1.5 | 1 | 1 | 8 |
| | | | 16 | 3 | 1 | 1 | 8 |
| | | | 32 | 6 | 1 | 1 | 8 |

+Sequestrene 138 Fe = a commercially available iron fertilizer based on an iron chelate complex of ethylenediamine-N,N'-di-(o-hydroxyphenyl)-acetic acid The test results shown in Table A reveal that the compound (1) according to the invention (disodium pentacyanonitrosylferrate), when mixed with the culture substrate in relatively low proportions, was able very efficiently to overcome high-grade iron deficiency in chrysanthemums. An improvement over the comparison standard preparation was found since not only young leaves turned green again, but in addition older leaves also partially turned green. The preparation according to the invention was fully effective over a relatively broad range of application, without causing damage to plants.

EXAMPLE 2

Combating iron deficiency/root uptake test/greenhouse

Test plant: Chrysanthemum indicum (variety: Yellow Delaware)

Culture substrate: Mixture of polystyrene foam flock (Styromull) and potassium alginate in the volume ratio of 10:1.

Test plants were grown in a culture substrate of the above-mentioned composition, fertilization and watering being effected by adding, twice weekly, a mineral iron deficiency nutrient solution according to Hoagland and Arnon (Circular 347, College of Agriculture, University of California, Berkeley 1950). The completely chlorotic test plants grown in this way were transplanted, at the five-leaf stage, into another culture substrate of the above-mentioned composition, to which, however, the particular desired amount of iron fertilizer had been added. During the further growth, fertilization and watering were effected in the same way as during the initial growth.

The evaluation took place when an average of 6 leaves had newly formed on the plants treated with an optimum amount of a water-soluble commercially available iron fertilizer. In each case, the average number of newly formed leaves was determined on all test plants. Furthermore, the intensity of the green color of newly formed leaves was rated and expressed on a numerical scale. In this, the figures denote:

1 = 0% chlorotic (dark green)
3 = 25% chlorotic
5 = 50% chlorotic
7 = 75% chlorotic
9 = 100% chlorotic (corresponding to the untreated control plants)

The nutrients, nutrient concentrations and experimental results can be seen from the table which follows:

Table 2

Combating iron deficiency/root uptake test/greenhouse
Test plant: Chrysanthemum indicum/variety: Yellow Delaware

| Nutrient | Water solubility of the preparation | Nutrient preparation concentration in the substrate [mg/l] | Iron concentration in the substrate [mg/l] | Intensity of the green color of young leaves | Average number of newly formed leaves | Notes |
|---|---|---|---|---|---|---|
| — (control) | — | — | — | 9 | 0 | |
| $FeSO_4 \cdot 7H_2O$ (known) | complete | 15 | 3 | 9 | 0 | |
| 'Sequestrene 138 Fe'+ (known) | complete | 50 | 3 | 2 | 6 | |
| $Na_2[Fe(CN)_5NO] \cdot 2H_2O$ (1) | complete | 8 | 1.5 | 1 | 8 | Older leaves markedly turned green |
| | | 16 | 3 | 1 | 8 | |
| | | 32 | 6 | 1 | 8 | |
| $Na_3[Fe(CN)_5NO_2] \cdot 2H_2O$ (2) | complete | 50 | 8.5 | 1–2 | 10 | Older leaves markedly turned green |
| $Na_4[Fe(CN)_5NO_2]$ (3) | complete | 50 | 8.7 | 2 | 7 | Old leaves markedly turned green |
| $Na_3[Fe(CN)_5H_2O] \cdot H_2O$ | complete | 50 | 9.6 | 1 | 3 | (4) |

+'Sequestrene 138 Fe' = a commercially available iron fertilizer based on an iron chelate complex of ethylenediamine-N,N'-di-(o-hydroxyphenyl)-acetic acid

EXAMPLE C

Combating iron deficiency/root uptake test/greenhouse

Test plant: Vines (variety: Muller Thurgau)

Culture substrate: Mixture of polystyrene foam flock (Styromull) and potassium alginate in the volume ratio of 10:1.

Test plants were grown in a culture substrate of the above-mentioned composition, fertilization and watering being effected by adding, twice weekly, a mineral iron deficiency nutrient solution according to Hoagland and Arnon (Circular 347, College of Agriculture, University of California, Berkeley 1950). The completely chlorotic test plants grown in this way were transplanted, at the five-leaf stage, into another culture substrate of the above-mentioned composition, to which, however, the particular desired amount of iron fertilizer had been added. During the further growth, fertilization and watering were effected in the same way as during the initial growth.

The evaluation took place when an average of 5 leaves had newly formed on the plants treated with an optimum amount of a water-soluble commercially available iron fertilizer. In each case, the average number of newly formed leaves was determined on all test plants. Furthermore, the intensity of the green color of newly formed leaves was rated and expressed on a numerical scale. In this, the figures denote:

1 = 0% chlorotic (dark green)
3 = 25% chlorotic
5 = 50% chlorotic
7 = 75% chlorotic
9 = 100% chlorotic (corresponding to the untreated control plants)

The nutrients, nutrient concentration and experimental results can be seen from the table which follows:

Culture substrate: Mixture of polystyrene foam flow (Styromull) and potassium alginate in the volume ratio of 10:1

Nutrient preparation: To prepare a suitable nutrient preparation, the particular amount of nutrient desired was dissolved in water.

Test plants were grown in a culture substrate of the above-mentioned composition, fertilization and watering being effected by adding, twice weekly, a mineral iron deficiency nutrient solution according to Hoagland and Arnon (Circular 347, College of Agriculture, University of California, Berkeley 1950). This completely chlorotic test plants grown in this way, in the five-leaf stage, were sprayed with the nutrient preparation until dripping wet, using covers to ensure that the nutrient preparation did not enter the culture substrate. After 4 days the plants were again sprayed with the nutrient preparation in the same manner.

The evaluation took place 15 days after the first spraying.

In each case, the average number of newly formed leaves was determined on all test plants. Furthermore, the intensity of the green color of newly formed leaves was rated and expressed on a numerical scale. In this, the figures denote:

1 = 0% chlorotic (dark green)
3 = 25% chlorotic

Table 3

| Nutrient preparation | Water solubility of the preparation | Nutrient preparation concentration in the substrate [mg/l] | Iron concentration in the substrate [mg/l] | Intensity of the green color of young leaves | Average number newly of formed leaves |
|---|---|---|---|---|---|
| — (control) | — | — | — | 9 | 0 |
| $FeSO_4 \cdot 7H_2O$ (known) | complete | 15 | 3 | 9 | 0 |
| 'Sequestrene 38 Fe'+ (known) | complete | 50 | 3 | 2 | 5 |
| $Na_2[Fe(CN)_5NO] \cdot 2H_2O$ (1) | complete | 50 | 9.4 | 2 | 7 |
| $Na_3[Fe(CN)_5NO_2] \cdot 2H_2O$ (2) | complete | 50 | 8.5 | 2 | 5 |
| $Na_4[Fe(CN)_5NO_2]$ (3) | complete | 50 | 8.7 | 2 | 5 |
| $Na_3[Fe(CN)_5H_2O] \cdot H_2O$ (4) | complete | 50 | 9.6 | 2 | 7 |

+'Sequestrene 138 Fe' = a commercially available iron fertilizer based on an iron chelate complex of ethylenediamine-N,N'-di-(o-hydroxyphenyl)-acetic acid

EXAMPLE 4

Combating iron deficiency/leaf uptake test/greenhouse

Test plant: Chrysanthemum indicum (variety: Yellow Delaware)

5 = 50% chlorotic
9 = 100% chlorotic (corresponding to the untreated control plants)

The nutrients, nutrient concentrations and experimental results can be seen from the table which follows:

Table 4

Combating iron deficiency/leaf uptake test/greenhouse
Test plant: *Chrysanthemum indicum* variety: Yellow Delaware

| Nutrient | Water-solubility of the preparation | Iron content of the preparation [% by weight] | Nutrient preparation concentration in the spray liquor [mg/ 100 ml of $H_2O$] | Intensity of the green color of young leaves | Average number of newly formed leaves | Notes |
|---|---|---|---|---|---|---|
| — (control) | — | — | — | 9 | 0 | |
| 'Fetrilon'+ (known) | complete | 5 | 200 | 2 | 3 | |
| $Na_2[Fe(CN)_5NO]2H_2O$ (1) | complete | 18.7 | 13.3 | 5 | 0 | green blotches |
| | | | 26.6 | 2 | 3 | form on older |
| | | | 53.3 | 2 | 3 | leaves, increas- |
| | | | 100 | 1 | 4 | ing with rising |

Table 4-continued

Combating iron deficiency/leaf uptake test/greenhouse
Test plant: *Chrysanthemum indicum* variety: Yellow Delaware

| Nutrient | Water-solubility of the preparation | Iron content of the preparation [% by weight] | Nutrient preparation concentration in the spray liquor [mg/100 ml of H$_2$O] | Intensity of the green color of young leaves | Average number of newly formed leaves | Notes |
| --- | --- | --- | --- | --- | --- | --- |
| | | | | | | amount of preparation |

+'Fetrilon' = a commercially available iron fertilizer based on an iron chelate complex of sodium ethylenediaminetetraacetate The test results listed in Table 4 reveal that the compound (1) according to the invention (disodium pentacyanonitrosylferrate) showed not only good root uptake but also advantageous leaf adsorption. The latter was greater than that of a comparison standard preparation, because partial uptake of iron occurred even on the older leaves, as manifested by the green blotches on these leaves.

EXAMPLE 5

Combating iron deficiency/leaf uptake test/greenhouse

Test plant: Chrysanthemum indicum (variety: Yellow Delaware)

Culture substrate: Mixture of polystyrene foam flock (Styromull) and potassium alginate in the volume ratio of 10:1

Nutrient preparation: To prepare a suitable nutrient preparation, the particular amount of nutrient desired was dissolved in water.

Test plants were grown in a culture substrate of the above-mentioned composition, fertilization and watering being effected by adding, twice weekly, a mineral iron deficiency nutrient solution according to Hoagland and Arnon (Circular 347, College of Agriculture, University of California, Berkeley 1950). The completely chlorotic test plants grown in this way, in the five-leaf stage, were sprayed with the nutrient preparation until dripping wet, using covers to ensure that the nutrient preparation did not enter the culture substrate. After 2 days the plants were again sprayed with the nutrient preparation in the same manner.

The evaluation took place when an average of 4 leaves had newly formed on the plants treated with an optimum amount of a water-soluble commercially available iron fertilizer. In each case, the average number of newly formed leaves was determined on all test plants.

Furthermore, the intensity of the green color of newly formed leaves was rated and expressed on a numerical scale. In this, the figures denote:

1 = 0% chlorotic (dark green)
3 = 25% chlorotic
5 = 50% chlorotic
7 = 75% chlorotic
9 = 100% chlorotic (corresponding to the untreated control plants)

The nutrients, nutrient concentrations and experimental results can be seen from the table which follows:

Table 5

Combating iron deficiency/leaf uptake test/greenhouse
Test plant: *Chrysanthemum indicum*/variety: Yellow Delaware

| Nutrient preparation | Water-solubility of the preparation | Nutrient preparation in the spray liquor [% by weight] | Iron concentration in the spray liquor[ppm] | Intensity of the green color of young leaves | Average number of newly formed leaves | Notes |
| --- | --- | --- | --- | --- | --- | --- |
| — (control) | — | — | — | 9 | 0 | |
| 'Fetrilon'+ (known) | complete | 0.2 | 100 | 3 | 4 | Green variegation of treated leaves |
| Na$_2$[Fe(CN)$_5$NO] . 2H$_2$O | complete | 0.1 | 187 | 2 | 4 | |

+'Fetrilon' = a commercially available iron fertilizer based on an iron chelate complex of sodium ethylenediaminetetraacetate

EXAMPLE 6

Migration capacity of nutrient preparations in an alkaline iron-deficient soil/laboratory test Iron-deficient soil of the "Redzine brown loam" variety was taken from a vineyard in Retzstadt (near Wurzburg). This soil, which had a high carbonate content and a pH value of 8.2 was divided up into fractions of different particle sizes. 600 g of the soil fraction in which the particle sizes were 1 to 2 mm were introduced into a measuring cylinder which had a volume capacity of 500 ml, a height of 25 cm and a diameter of 5 cm and was perforated on the underside. At the beginning of each experiment, 100 mg of the particular nutrient preparation in the form of a concentrated aqueous solution were applied to the surface of the soil in the column. Thereafter, distilled water from a Mariotte bottle was fed onto the column of soil so that the latter was constantly kept in the moist state while the water level remained the same. The seepage water which ran out of the column was collected and examined daily for its iron content.

The results of the measurements are summarized in the table which follows:

Table 6

Migration capacity of nutrient preparations in an alkaline iron-deficient soil/laboratory test

| Nutrient preparation | Amount of preparation per column [in mg] | Amount of iron in the seepage water (measured daily, in μg) | | | | | | | | | Total amount of seepage water after 9 days [in μmg] |
|---|---|---|---|---|---|---|---|---|---|---|---|
| | | 1st day | 2nd day | 3rd day | 4th day | 5th day | 6th day | 7th day | 8th day | 9th day | |
| — (control) | — | 30.74 | — | — | — | 0.42 | 26.26 | — | — | 14.80 | 72.2 |
| Sequestrene 138 Fe+ (known) | 100 | 625.03 | 4,865.00 | 269.71 | 59.36 | 40.00 | 124.23 | 157.29 | — | — | 6,140.6 |
| Na₂[Fe(CN)₅NO] . 2H₂O (1) | 100 | 265.36 | 6,223.75 | 212.16 | 54.43 | 34.88 | 165.71 | 45.90 | — | — | 7,002.2 |

+Sequestrene 138 Fe = a commercially available iron fertilizer based on an iron chelate complex of ethylenediamine-N,N-di-(o-hydroxyphenyl)-acetic acid The experimental results listed in Table 6 reveal that the speed of migration of the compound (1) according to the invention (disodium pentacyanonitroyslferrate) was considerable. The preparation therefore is very suitable for application to the soil, which can inter alia be done by:

a. pouring treatment in furrouws and punched holes,
b. use of fertilizer lances and
c. dissolving the preparation in the water used for watering.

EXAMPLE G

Combating iron deficiency/root uptake test/experiment in the open

Test plant: Peach (variety: Cardinal)
Culture substrate: Alkaline iron-deficient soil In an experiment in the open in Greece (Veria/Macedonia) peach trees which had grown for 13 years on an alkaline iron-deficient soil were watered, at the beginning of the experiment, with 10 liters of water per tree, the particular desired amount of nutrient preparation being contained in solution in the water used for watering.

At the beginning of the experiment and after 3 and 7 weeks, the degree of yellowing of the leaves was determined by the method of Townsend and Heuberger (see "Bayer" Pflanzenschutz-Nachrichten (Plant Protection News) 20, 625 –628 (1967) and quoted in percent. The figures mean:

0% = leaves dark green (not chlorotic)
100% = leaves completely yellowed (chlorotic)

Furthermore, 3 and 7 weeks after the beginning of the experiment, the efficiency of the nutrient preparations employed was also determined in accordance with the method of Henderson and Tilton (see Bayer Pflanzenschutz-Nachrichten (Plant Protection News) 16, 148–157 (1963)) and quoted in percent. The figures mean:

0% = leaves completely yellowed (chlorotic)
100% = leaves dark green (not chlorotic)

The nutrients, amounts of nutrient and experimental results can be seen from the table which follows:

Table 7

Combating iron deficiency/root uptake test/experiment in the open
Test plant: Peach (variety: Cardinal)

| Nutrient preparation | Amount of nutrient [g per tree] | Degree of yellowing of the leaves at the start of the experiment (%) | After 3 weeks: Degree of yellowing of the leaves (%) | Efficiency (%) | After 7 weeks: Degree of yellowing of the leaves (%) | Efficiency (%) |
|---|---|---|---|---|---|---|
| — (control) | — | 91.6 | 93.1 | — | 99.8 | — |
| Sequestrene 138 Fe+ (known) | 100 | 87.3 | 46.0 | 48.2 | 7.1 | 92.5 |
| Na₂[Fe(CN)₅NO] . 2H₂O (1) | 31 | 90.0 | 50.2 | 45.1 | 13.3 | 86.4 |
| | 62 | 92.3 | 46.3 | 49.8 | 6.0 | 94.0 |

+Sequestrene 138 Fe = a commercially available iron fertilizer based on an iron chelate complex of ethylenediamine-N,N-di-(o-hydroxyphenyl)-acetic acid.

EXAMPLE 8

Combating iron deficiency/root uptake test/experiment in the open

Test plant: Peach (variety: Hall)
Culture substrate: Alkaline iron-deficient soil In an experiment in the open in Greece (Veria/Macedonia) peach trees which had grown for 14 years on an alkaline iron-deficient soil were watered, at the beginning of the experiment, with 15 liters of water per tree, the particular desired amount of nutrient preparation being contained in solution in the water used for watering.

At the beginning of the experiment and after 10 and 38 days, the degree of yellowing of the leaves was determined by the method of Townsend and Heuberger (see Bayer Pflanzenschutz-Nachrichten (Plant Protection News) 20, 625–628 (1967)) and quoted in percent. The figures mean:

0% = leaves dark green (not chlorotic)
100% = leaves completely hellowed (chlorotic)

Furthermore, 10 and 38 days after the beginning of the experiment, the efficiency of the nutrient preparations employed was also determined in accordance with the method of Henderson and Tilton (see Bayer Pflanzenschutz-Nachrichten (Plant Protection News) 16, 148-157 (1963)) and quoted in percent. The figures mean:

0% = leaves completely yellowed (chlorotic)
100% = leaves dark green (not chlorotic)

The nutrients, amounts of nutrient and experimental results can be seen from the table which follows:

Table 8

| | | | Combating iron deficiency/root uptake test/experiment in the open Test plant: Peach (variety: (Hall) | | | |
|---|---|---|---|---|---|---|
| | | Degree of yellowing of the leaves at the start | After 3 weeks: Degree of yellowing | | After 7 weeks: Degree of yellowing | |
| Nutrient preparation | Amount of nutrient [g per tree] | of the experiment (%) | of the leaves (%) | Efficiency (%) | of the leaves (%) | Efficiency (%) |
| — (control) | — | 85.9 | 90.0 | — | 96.4 | — |
| Sequestrene 138 Fe+ (known) | 100 | 82.2 | 40.0 | 53.6 | 5 | 94.6 |
| Na$_2$[Fe(CN)$_5$NO] . 2H$_2$O | 31 | 82.4 | 51.6 | 40.2 | 12.3 | 86.7 |
| (1) | 62 | 91.1 | 40.3 | 57.8 | 4.6 | 95.5 |

+Sequestrene 138 Fe = a commercially available iron fertilizer based on an iron chelate complex of ethylenediamine-N,N'-di-(o-hydroxyphenyl)-acetic acid It will be appreciated that the instant specification and examples are set forth by way of illustration and not limitation, and that various modifications and changes may be made without departing from the spirit and scope of the present invention.

What we claim is:

1. A method of supplying plants with micro-nutrients, which comprises applying to the plants or a plant habitat, an effective amount of a prussiate of the formula

M$_a$[Fe(CN)$_5$X]$_b$ in which
M is an alkali metal ion, alkaline earth metal ion, heavy metal ion, ammonium ion or hydrogen,
X is a group which can occupy the sixth coordination position on the iron, or a suitable organic radical,
$a$ is 2, 3, 4 or 5, and
$b$ is 1, 2 or 3.

2. The method according to claim 1, wherein the prussiate is present in the form of its hydrate.

3. The method according to claim 1, wherein the prussiate is applied to an area of plant cultivation in an amount of between about 0.1 and 100 kg/hectare.

4. The method according to claim 1, wherein the prussiate is applied in an amount of between about 1 and 50 kg/hectare.

5. The method according to claim 4, wherein M is sodium, potassium, calcium, magnesium, barium, ammonium or hydrogen, and X is NO, H$_2$O, CO, NH$_3$, NO$_2$, AsO$_2$, SO$_3$, NH$_2$NH$_2$, NO—CH$_3$, NO—C$_2$H$_5$ or NO—S—C(=NH)NH$_2$.

6. The method according to claim 1, wherein said prussiate is Na$_2$[Fe(CN)$_5$NO].

7. The method according to claim 1, wherein said prussiate is Na$_3$[Fe(CN)$_5$NO$_2$].

8. The method according to claim 1, wherein said prussiate is Na$_4$[Fe(CN)$_5$H$_2$O].

* * * * *